United States Patent
Pietrzak et al.

(10) Patent No.: US 8,835,792 B2
(45) Date of Patent: Sep. 16, 2014

(54) METAL-SHEATHED STRUCTURE STRIPPER

(75) Inventors: Witold Pietrzak, Maricopa, AZ (US); Donald Robert Way, Scottsdale, AZ (US)

(73) Assignee: The Cleveland Electric Laboratories Company, Twinsburg, OH (US)

( * ) Notice: Subject to any disclaimer, the term of this patent is extended or adjusted under 35 U.S.C. 154(b) by 1287 days.

(21) Appl. No.: 12/082,321

(22) Filed: Apr. 10, 2008

(65) Prior Publication Data

US 2008/0251499 A1 Oct. 16, 2008

Related U.S. Application Data

(60) Provisional application No. 60/922,594, filed on Apr. 10, 2007.

(51) Int. Cl.
*H02G 1/12* (2006.01)
*H01R 43/28* (2006.01)

(52) U.S. Cl.
CPC ............... *H02G 1/1275* (2013.01); *H02G 1/12* (2013.01); *H01R 43/28* (2013.01)
USPC .... 219/68; 219/69.13; 219/69.15; 219/69.17; 219/69.18

(58) Field of Classification Search
CPC .................................. H01R 43/28; H02G 1/12

USPC ................ 219/68, 69.13, 69.15, 69.17, 69.18
See application file for complete search history.

(56) References Cited

U.S. PATENT DOCUMENTS

| | | | |
|---|---|---|---|
| 1,632,320 A | 6/1927 | Sippel et al. | |
| 2,192,056 A | 2/1940 | Watts | |
| 2,377,159 A * | 5/1945 | Kurtz et al. | 125/30.02 |
| 2,396,594 A | 3/1946 | Moore | |
| 3,143,635 A * | 8/1964 | Hooker | 219/221 |
| 3,205,378 A * | 9/1965 | Kline | 307/112 |
| 3,604,888 A * | 9/1971 | Friess et al. | 219/113 |
| 3,641,306 A * | 2/1972 | Oakes | 219/113 |
| 3,659,332 A | 5/1972 | Morrone | |
| 3,761,672 A * | 9/1973 | Baker et al. | 219/68 |
| 3,953,706 A | 4/1976 | Harris et al. | |
| 4,228,340 A * | 10/1980 | Dufrenne | 219/113 |
| 4,384,314 A * | 5/1983 | Doty et al. | 361/160 |
| 4,704,925 A | 11/1987 | Sutton | |
| 6,462,507 B2 * | 10/2002 | Fisher, Jr. | 320/101 |

* cited by examiner

*Primary Examiner* — Henry Yuen
*Assistant Examiner* — Diallo I Duniver
(74) *Attorney, Agent, or Firm* — Emerson Thomson Bennett, LLC; Roger D. Emerson; Sergey Vernyuk

(57) ABSTRACT

A device and method for the removal of a metal-sheath layer from a metal-sheathed structure using capacitive discharge in conjunction with step-up and step-down transformers to create a low voltage, high current pulse to remove a selected portion of the metal-sheath layer from the metal-sheathed structure.

2 Claims, 5 Drawing Sheets

METAL-SHEATHED STRUCTURE STRIPPER

This application claims priority to U.S. Provisional Patent Application Ser. No. 60/922,594, titled METAL-SHEATHED STRUCTURE STRIPPER, filed Apr. 10, 2007, which is incorporated herein by reference in its entirety.

I. BACKGROUND OF THE INVENTION

A. Field of Invention

This invention pertains to the art of methods and apparatuses for structure stripper devices, and more specifically, to a method and apparatus for removing a predetermined portion of a metal-sheathed structure.

B. Description of the Related Art

It is known that a metal-sheathed structure includes a generally cylindrical metal housing or metal-sheath layer that encircles at least one, and optionally a plurality of electrically or optically conductive elements, such as an optical fiber or bundle thereof. When observing a cross-sectional view of the metal-sheathed structure the metal-sheath layer forms a cylindrical shell disposed radially outward from the conductive elements. A dielectric material surrounds and insulates the conductive elements from the metal-sheath layer. The dielectric material reduces or minimizes the amount of electric energy, being conducted by the conductive elements, transmitted to the ambient environment surrounding the metal-sheathed structure via the metal-sheath layer.

It is known that in order to gain access to the conductive elements at least a portion of the metal-sheath layer must be removed. By removing a portion of the metal-sheath layer, the conductive elements can be exposed and subsequently coupled to an electrical circuit or conductive pathway. Commonly, the removed portion of the metal-sheath layer is located adjacent to a terminal end of the metal-sheathed structure.

Conventional methods and devices for removing a portion of the metal-sheath layer require one or more sharp cutter heads or blades to be placed against the metal-sheath layer. Either the metal-sheathed structure itself or the cutter heads are then rotated about the longitudinal axis of the metal-sheathed structure. This rotation causes the cutter heads to physically cut or score the metal-sheath layer. The cutter heads must cut or score the metal-sheath layer to a depth sufficient to allow the terminal portion of the metal-sheath layer to be separated and removed from the metal-sheathed structure without damaging the conductive elements.

Although known devices and methods for removing a portion of the metal-sheath layer of a metal-sheathed structure work well for their intended purpose, several disadvantages exist. The conventional methods and devices for removing the metal-sheath layer from the metal-sheathed structure impart rotational forces on the conductive elements disposed inward of the metal-sheath layer. Such forces can result in fatigue damage to the conductive elements. This fatigue damage interferes with or impairs the conduction of the electric energy via the metal-sheathed structure. Further, such methods and devices are time consuming and create hazardous conditions by exposing operators to the sharp edges of the cutter heads themselves and to the sharp edges of the metal-sheath layer resulting from the conventional wire stripping process.

Accordingly, there is a need in the art for a method and device for at least partially removing a portion of the metallic sheathing or metal-sheath layer from a metal-sheathed structure that mitigates, diminishes or eliminates the damage to an electrical conductor disposed radially inward of the metal-sheath layer.

II. SUMMARY OF THE INVENTION

Some embodiments are directed to a device, comprising: a means for drawing electrical power from a mains; a means for stepping up the voltage of the electrical power to a predetermined level; a means for forming and maintaining a capacitance using the stepped up electrical power; a means for triggering a discharge of the capacitance; a means for stepping down the voltage of the discharge current to a predetermined level; and a means for directing the stepped down discharge current to at least a portion of a work piece and causing the portion to be vaporized and/or oxidized.

Other embodiments are directed to a process for stripping metallic sheathing comprising the steps of: drawing electrical power from a mains; stepping up the voltage of the electrical power to a predetermined level; forming and maintaining a capacitance using the stepped up electrical power; triggering a discharge of the capacitance; stepping down the voltage of the discharge current to a predetermined level; and directing the stepped down discharge current to at least a portion of a work piece and causing the portion to be vaporized and/or oxidized.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, an embodiment of which will be described in detail in this specification and illustrated in the accompanying drawings which form a part hereof and wherein.

IV. DETAILED DESCRIPTION OF THE INVENTION

Figure 1:
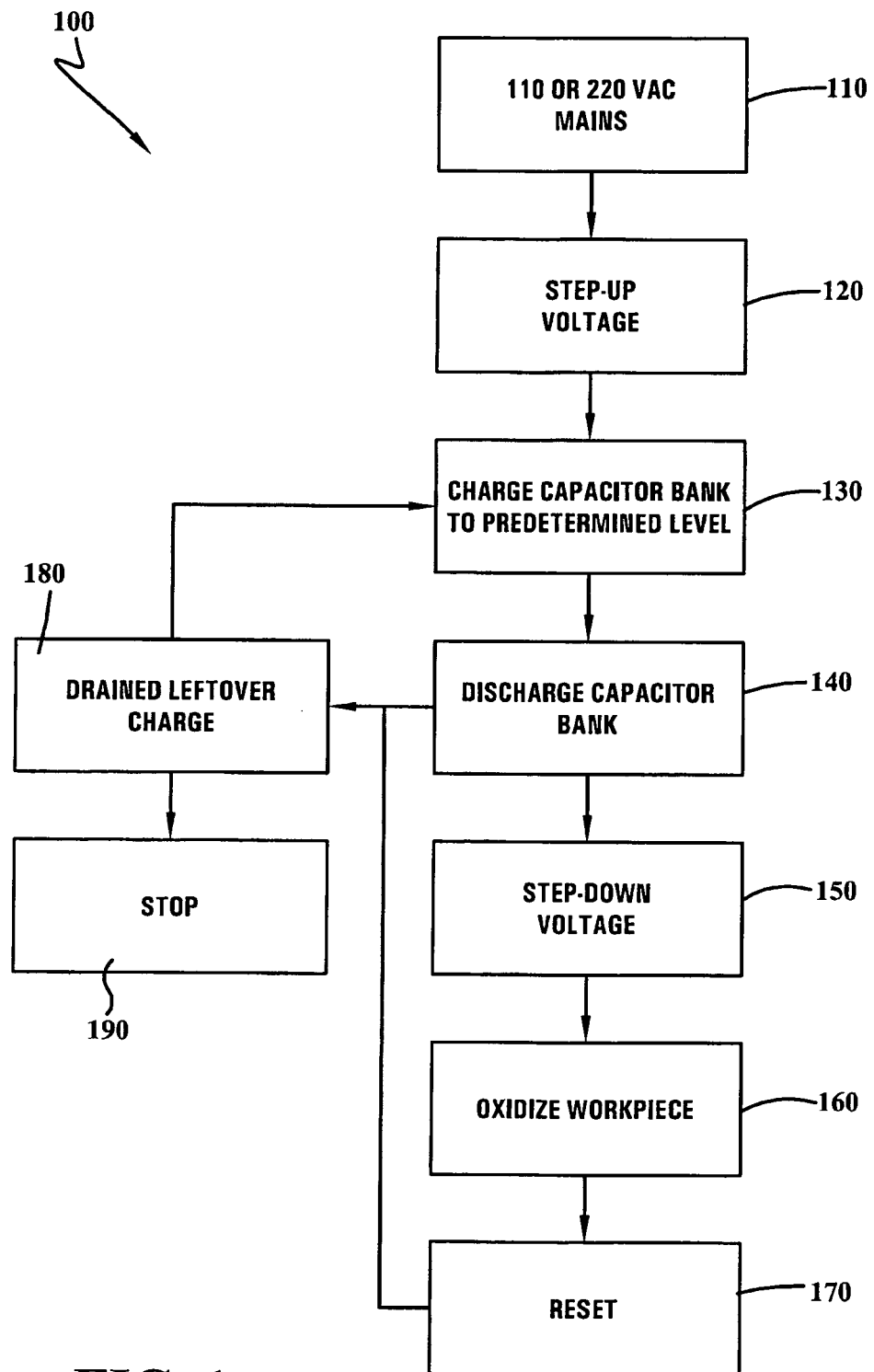
FIG. 1 is a flowchart showing an embodiment comprising the basic steps carried out by a device of the present invention.

The present invention relates to devices and methods for removing metal sheathing from structures such as electrical cables, optical cables, and thermocouple devices. According to some embodiments, electric power is supplied to the device from a standard 110 VAC or 220 VAC mains. The electricity supplied to the embodiment can be directed to one or more capacitors, which develop a relatively large capacitance. The capacitance can be caused to discharge by an operator. The discharged current can be directed to one or more step-down transformers. Furthermore, according to some embodiments the voltage can be stepped down to such a degree that the output current of the transformer is very large. This large current can be conducted to a first electrode. If a conductor is placed in electrical communication with the first electrode and a second electrode simultaneously, then the current will pass through the conductor, and the conductor may be vaporized and/or oxidized. Furthermore, selected portions of the conductor can be vaporized and/or oxidized. For example, the conductor can be electrically contacted at a first point by the first electrode, and at a second point by the second electrode. Accordingly current passing from the first electrode to the second electrode must pass through the region between the first and second points on the conductor. This region is therefore rapidly vaporized and/or oxidized and takes on an ashy consistency, which allows it to be easily removed.

In some embodiments electricity supplied by a mains is directed to a step-up transformer which is disposed upstream from a capacitor or capacitor bank. In some embodiments the step-up transformer can increase the voltage to about 300 VAC, 400 VAC, 500 VAC, or even about 600 VAC. In some embodiments the step-up transformer can comprise a single transformer, or a plurality of transformers arranged in series. For example, two 250 VAC step-up transformers arranged in series produce a combined output voltage of 500 VAC. One of skill in the art will readily appreciate that a wide variety of known arrangements can produce a desired voltage output.

In some embodiments the output of the step-up transformer can be directed to a capacitor bank. In other embodiments, the output of the step-up transformer can be directed to a solid state relay, which is adapted to switchably communicate the transformer's output to the capacitor bank. Furthermore, in some embodiments it may also be desirable to include a rectifier between the relay output and the capacitor bank input, for example, to prevent spontaneous discharge or self-discharge.

According to some embodiments the capacitor bank can hold maximum charge, no charge at all, or any charge level between zero and maximum. Thus, some embodiments can include a means for regulating the degree to which the capacitor bank is charged. One such means comprises a resistor between the step-up transformer and the capacitor bank. According to some embodiments, the resistor can comprise a single resistor or a plurality of resistors that can be selected with a selector switch. In other embodiments the resistor can comprise a continuously variable resistor, rheostat or potentiometer. In general, higher resistances correspond to higher charge voltages. Higher charge voltages are appropriate for larger work pieces and/or work pieces comprising more refractory metallic sheaths. An appropriate setting for a given work piece is determined in advance through brief experimentation. In determining appropriate settings, an operator should start with conservative charge-voltage settings, because excessive voltages may result in damage to the work piece.

According to some embodiments an appropriate capacitor bank is capable of developing from about 500 to about 500,000 micro-Farads (μF) of capacitance. In some embodiments an appropriate capacitance is from about 500 to 1000 μF, 1000 to 2000 μF, 2000 to 3000 μF, 3000 to 4000 μF, 4000 to 5000 μF, 5000 to 10,000 μF, 10,000 to 20,000 μF, 20,000 to 30,000 μF, 30,000 to 40,000 μF, 40,000 to 50,000 μF, 50,000 to 100,000 μF, 100,000 to 200,000 μF, 200,000 to 300,000 μF, 300,000 to 400,000 μF, or even 400,000 to 500,000 μF. Here, as elsewhere in the specification and claims, ranges may be combined.

According to some embodiments the discharge rate of the capacitor or capacitor bank is at least high enough to produce an electrical power sufficient to substantially vaporize and/or oxidize a metal sheath of a work piece. Appropriate discharge times can be from about 0.5 millisecond to about 1000 milliseconds (ms). More specifically, appropriate discharge times can be from about 0.5 to 10 ms, about 10 to 100 ms, or even about 100 to 1000 ms.

According to some embodiments the output voltage of the capacitor or capacitor bank comprises a voltage from about 100 to 600 VDC. More specifically, the output voltage can be from about 100 to 200 VDC, 200 to 300 VDC, 300 to 400 VDC, 400 to 500 VDC, or even about 500 to 600 VDC. According to some embodiments the output current is directed to one or more step-down transformers. Appropriate output voltages of a step-down transformer, or combination thereof arranged in series, can be from about 100 VDC to about 1 VDC. More specifically, appropriate voltages can be from about 100 to 90 VDC, 90 to 80 VDC, 80 to 70 VDC, 70 to 60 VDC, 60 to 50VDC, 50 to 40 VDC, 40 to 30 VDC, 30 to 20 VDC, 20 to 10 VDC, 10 to 5 VDC, or 5 to 1 VDC.

Furthermore, a plurality of step-down transformers can be arranged in parallel so as to enhance and/or maximize the discharge from the capacitors. For example, according to some embodiments five step-down transformers can be arranged in parallel. In one embodiment five step-down transformers having input voltages of about 500 VDC and output voltages of about 50 VDC are arranged in parallel. In a related embodiment each of the five transformers can comprise a pair of transformers arranged in series and having input voltages of 250 VDC. One of skill in the art will appreciate that a wide variety of arrangements can have a similar desirable effect, and can select a specific arrangement without undue experimentation.

Some embodiments also include one or more adjustable voltage regulators, potentiometers and/or rheostats, for adjusting the closed circuit voltage of the first electrode during capacitor discharge. Furthermore, voltage regulation may comprise a plurality of stages. For instance, in a first stage the voltage may be stepped from 500 VDC to 100, 75, 50, or 25 VDC. A second stage accepts the output of the first stage as its input and further adjusts, for instance, 100 VDC input to an output value between 100 VDC and 75 VDC. One of skill in the art will recognize that any of a wide variety of means for adjusting voltage can produce a suitable result, and one of skill in the art will be able to select an appropriate means without undue experimentation.

According to some embodiments any of a wide variety of materials can comprise the electrodes. In one specific embodiment the electrode material comprises a copper-infiltrated graphite electrode sold under the designation EDM-C3, which is available from EDM Supplies, Inc. (Sterling Heights, Mich.). One of skill in the art will be able to select an appropriate electrode material, having desirable electrical and mechanical properties, without undue experimentation.

In some embodiments the electrode comprises a carbonaceous electrode such as a glassy carbon or graphite electrode. Furthermore, some embodiment can include dopants in the electrode composition. For instance, some graphite electrodes can comprise an effective amount of a metal such as copper, nickel, iron, silver, platinum, gold, palladium or any combination thereof. Such dopants can comprise a portion of the electrode material ranging anywhere from 0 to about 100% by weight. More specifically, appropriate amounts of dopant can comprise 0 to 10%, 10 to 20%, 20 to 30%, 30 to 40%, 40 to 50%, 50 to 60%, 60 to 70%, 70 to 80%, 80 to 90% or even 90 to 100% by weight.

Furthermore, suitable electrodes can have resistivities from about 10 to 1000 μOhm/in. More specific suitable resistivity ranges include about 10 to 100 μOhm/in, 100 to 200 μOhm/in, 200 to 300 μOhm/in, 300 to 400 μOhm/in, 400 to 500 μOhm/in, 500 to 600 μOhm/in, 600 to 700 μOhm/in, 700 to 800 μOhm/in, 800 to 900 μOhm/in, or even about 900 to 1000 μOhm/in.

According to some embodiments, the electrodes can be arranged in a variety of suitable ways. For instance, in one embodiment the positive and negative electrodes can comprise a clamping structure, which is adapted to clamp onto a work piece. Suitable clamps can be pneumatically powered, electrically powered, spring loaded, manual, or the like or any combination thereof. Furthermore, in some embodiments the clamping structure comprises a hand-held unit.

Some embodiments can be appropriate for stripping metal-sheathed structures. For instance, some embodiments can be adapted to strip a variety of sizes and forms of coaxial cable, fiber optic cable, metal tubing, and/or thermocouple devices. Suitable work piece sizes can include diameters from about 0.01 inch to about 1 inch. Other suitable diameter ranges can comprise from about 0.01 to 0.05 inch, about 0.05 to 0.10 inch, about 0.10 to 0.15 inch, about 0.15 to 0.20 inch, about 0.20 to 0.25 inch, about 0.25 to 0.30 inch, about 0.30 to 0.35 inch, about 0.35 to 0.40 inch, about 0.40 to 0.45 inch, about 0.45 to 0.50 inch, about 0.50 to 0.55 inch, about 0.55 to 0.60 inch, about 0.60 to 0.65 inch, about 0.65 to 0.70 inch, about 0.70 to 0.75 inch, about 0.75 to 0.80 inch, about 0.80 to 0.85 inch, about 0.85 to 0.90 inch, about 0.90 to 0.95 inch, or even about 0.95 to 1 inch.

Turning now to the figures, which are intended only to illustrate rather than limit the present invention, FIG. 1 is a flowchart showing a process embodiment 100 carried out by a device of the present invention. According to the chart, electrical energy is taken into the system at step 110 from a standard electrical mains, such as a 110 or 220 V AC mains. Next the electrical energy is stepped up in voltage at step 120 to a predetermined level. The stepped-up voltage is directed to a capacitor bank and charges the bank to a predetermined level in step 130. The capacitor bank is then discharged according to actuation by an operator in step 140. The discharged electrical voltage is then stepped down in voltage to a predetermined level in step 150, which level has been determined to be suitable for a selected work piece. Subsequently the electrical energy is directed to at least a portion of a work piece in step 160, which is vaporized and/or oxidized thereby. When the work piece is sufficiently vaporized and/or oxidized it is no longer electrically conductive and the circuit is rendered open. Accordingly, the capacitor bank may or may not contain residual charge. In order to maintain reproducible charging characteristics, the next step is to fully discharge, or "reset," the capacitors in step 170. The system is now fully discharged in step 180, and the operator can elect to exit the process in step 190 or repeat the process on the same or different work piece.

Figure 2:
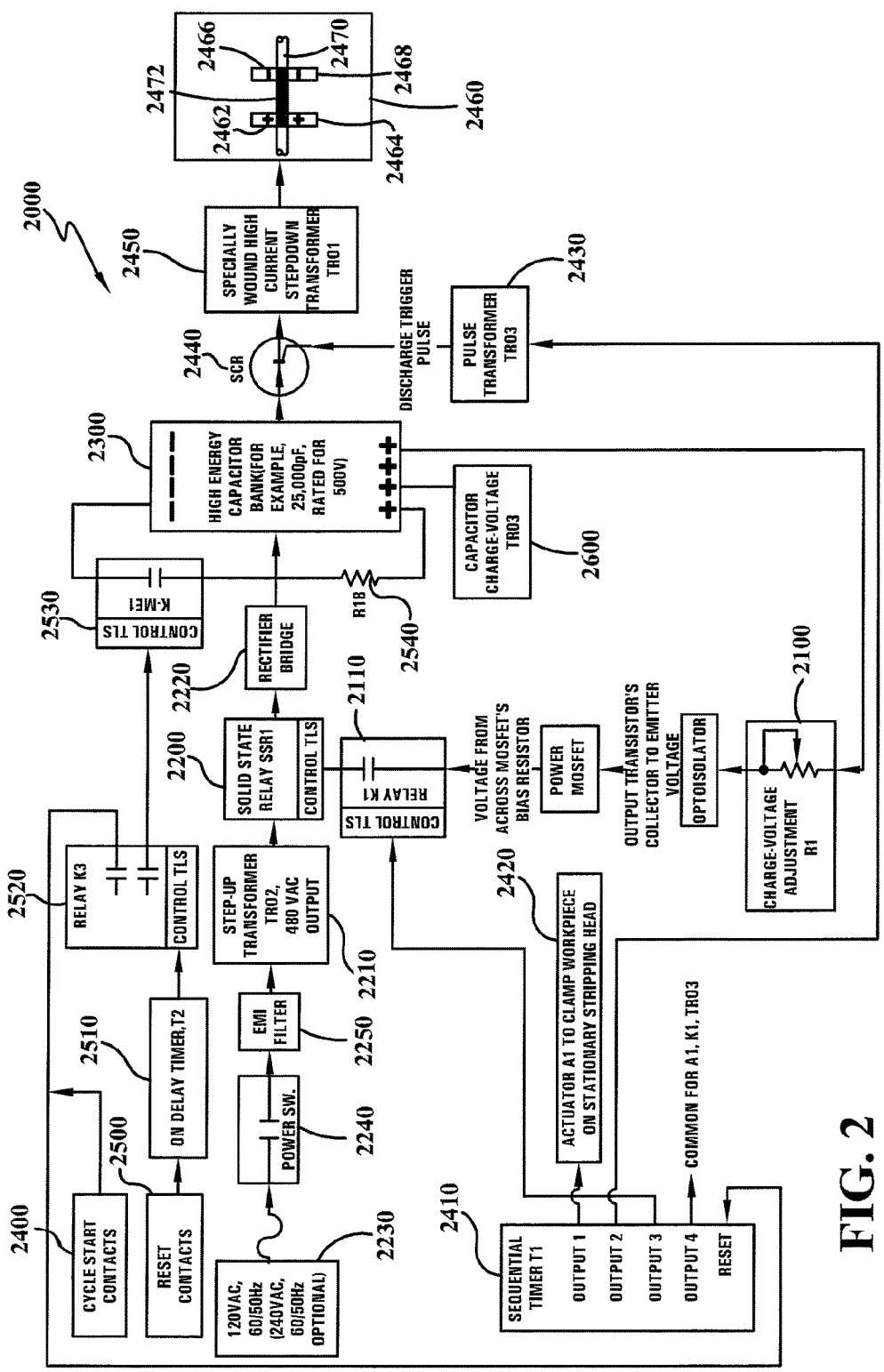
FIG. 2 is a block diagram illustrating an embodiment.

FIG. 2 is a block diagram illustrating an embodiment 2000 of the present invention. According to the embodiment 2000 in FIG. 2, charge voltage can be set in the following manner. The operator sets charge voltage adjustment resistor 2100 to a predetermined value that is appropriate for the size and type of metallic sheath to be stripped. The resistance of 2100 determines the charge voltage to be placed on the discharge capacitor bank 2300. Closing the contacts of relay 2110 causes relay 2200 to communicate the output of step-up transformer 2210 to rectifier 2220. The output of rectifier 2220 is then directed to capacitor bank 2300 thus charging the capacitors therein according to the voltage set by resistor 2100. According to this embodiment, the electric energy enters the system at a mains 2230, which may incorporate a main power switch 2240. The switch can optionally be directed to an electromagnetic interference filter 2250 known in the art. Accordingly, the input power of the step-up transformer 2210 may be pre-filtered.

Further according to FIG. 2, capacitor bank 2300 can be discharged at the direction of an operator. According to this embodiment, an operator initiates a discharge, by hitting a "cycle start" button 2400, which closes a contact and sends a resetting signal to sequential timer 2410. Sequential timer 2410 then serially generates three outputs. Output 1 causes the electrodes of the stripping head 2460 to clamp onto the work piece 2470. For example, in this embodiment the positive electrode comprises an upper part 2462 and lower part 2464. Similarly, the negative electrode comprises an upper part 2466 and a lower part 2468. The upper parts 2462, 2466 and lower parts 2464, 2468 clamp together as a result of Output 1 2420, thus trapping a work piece 2470 therein in electrical communication with the positive and negative electrodes. Sequential timer 2410 then generates Output 2, which sends a signal to pulse transformer 2430 causing transformer 2430 to send a triggering pulse to silicon controlled rectifier (SCR) 2440. Thus, SCR 2440 places the capacitor bank 2300 in electrical communication with step-down transformer 2450, which converts the discharge to a safe voltage level. The output of step-down transformer 2450 is then directed to the electrodes of the stripping head 2460, and through the work piece 2470, thereby forming unsheathed region 2472.

According to the embodiment of FIG. 2, at the conclusion of a stripping cycle, i.e. after a work piece is stripped, the capacitor bank 2300 may contain leftover charge. The operator can discharge the leftover charge by initiating a "reset" sequence. According to this embodiment, a contact is closed by pushing reset button 2500, which triggers on-delay timing relay 2510. Thus, on-delay timing relay 2510 directs electrical power to relay 2520 for a predetermined time, which in turn causes relay 2530 to close thus allowing the capacitor bank 2300 to discharge into resistor 2540. Generally, the on-delay timing relay 2510, and relays 2520 and 2530 remain closed long enough to sufficiently drain the capacitor bank 2300. Furthermore, drainage is sufficient if the charging characteristics of the capacitor bank 2300 are reproducible.

Some embodiments optionally include readout 2600, which allows the operator to determine whether the capacitor bank is sufficiently charged. Typically, the readout can comprise a voltage meter. Various other readouts may also be included to communicate particular process variables to the operator.

Figure 3:
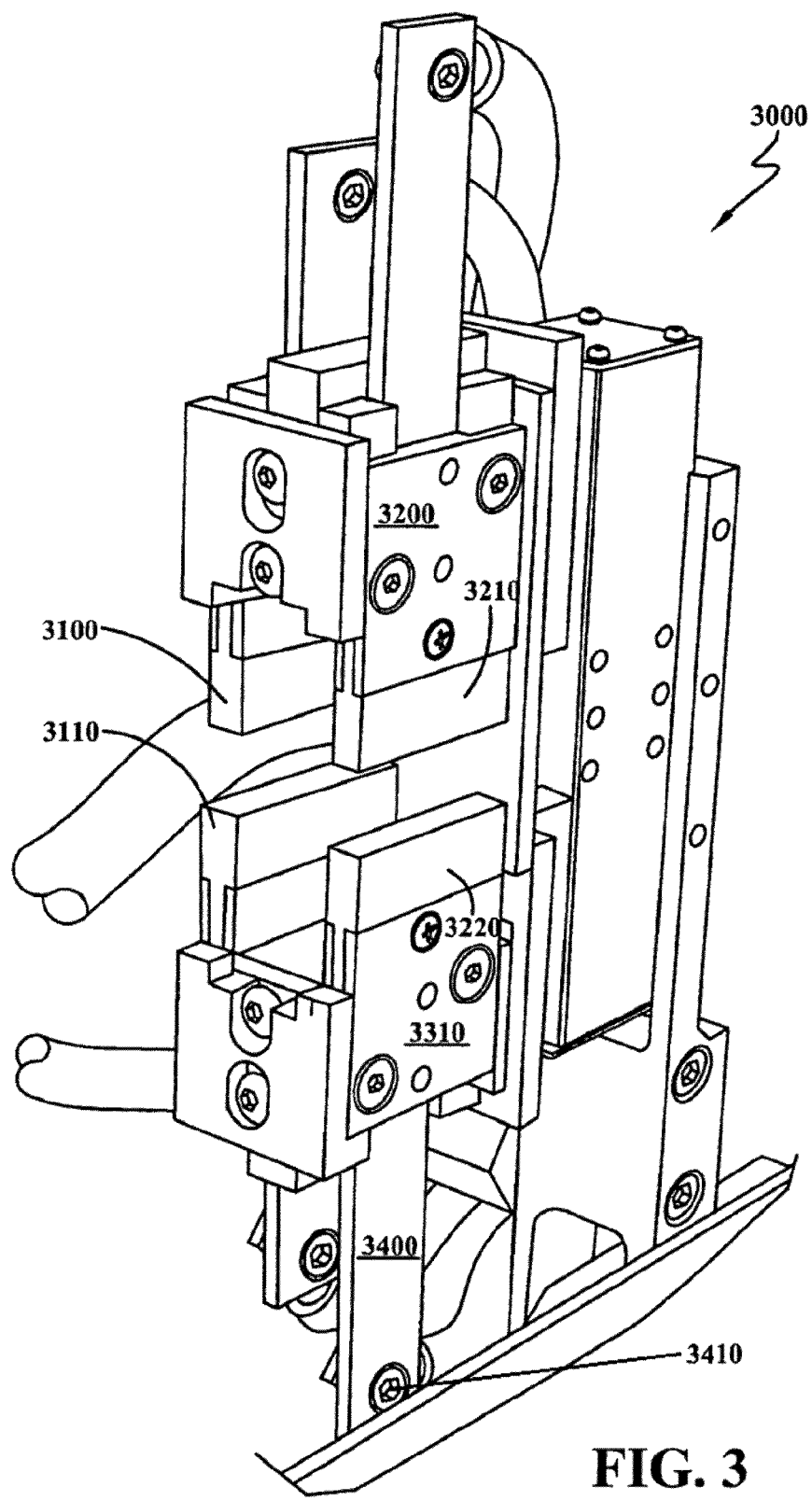
FIG. 3 is a drawing of a pneumatic embodiment.

FIG. 3 is a drawing showing an embodiment having stripping head 3000 with a pneumatically powered grip. The stripping head comprises a first pair of electrodes 3100 and 3110 having a first polarity, and a second pair of electrodes 3220 and 3210 having a polarity opposite to that of the first pair. The electrodes are mounted on opposing pneumatic mounts 3200 and 3310. During operation, the electrode pairs can be pneumatically driven together to grip a work piece. In this embodiment, the stripper head 3000 is mounted on a rotatable arm 3400, which comprises a pivot point 3410. The arm is adapted to rotate the head by about 90 degrees by pivoting on the pivot point, and may enhance the serviceability of the stripper head.

Figure 4:
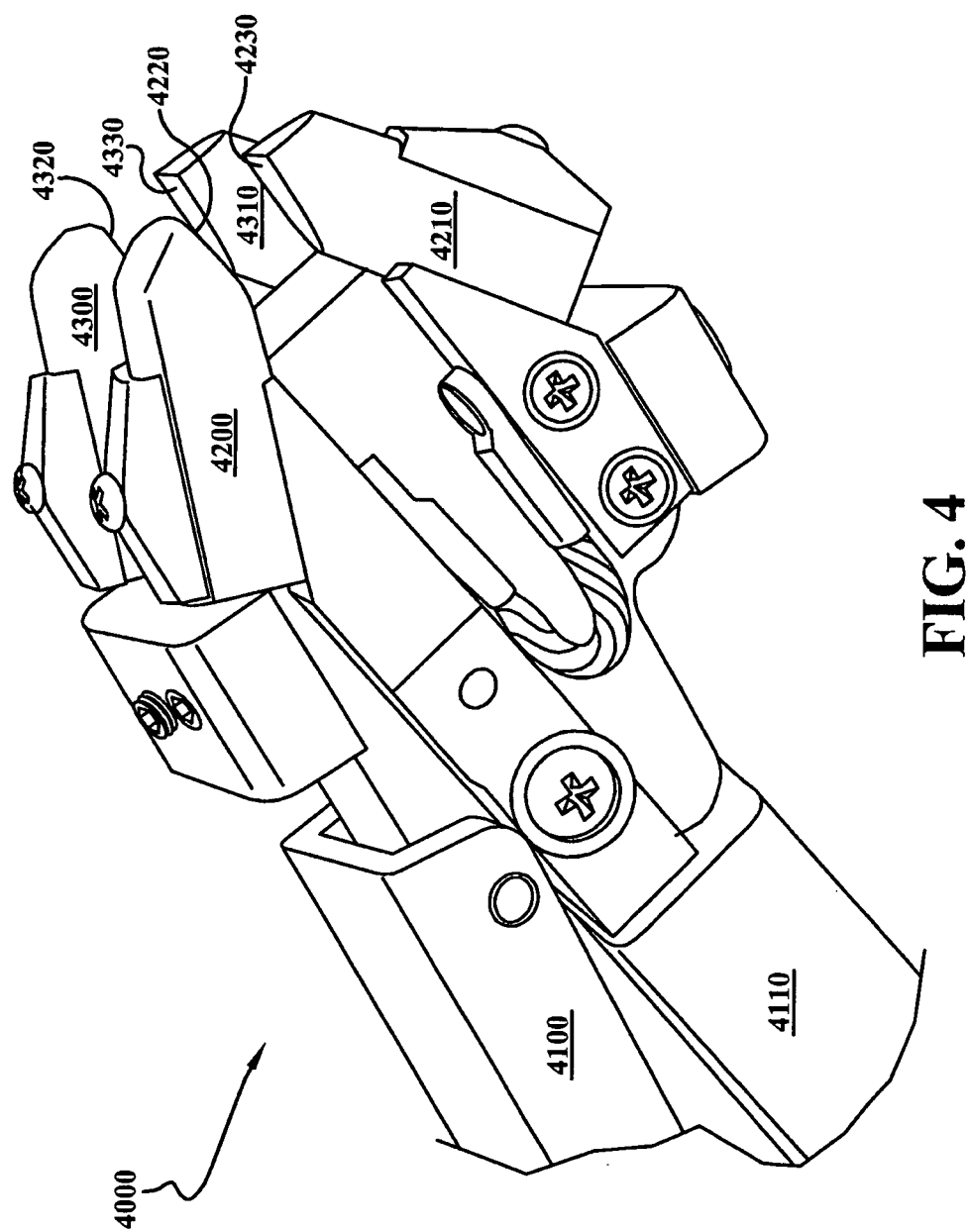
FIG. 4 is a drawing of a first hand-held spring-loaded embodiment.

FIG. 4 is a drawing of an embodiment having a hand-held stripper head 4000. The stripper head 4000 comprise a pair of handles 4100 and 4110 suitable for accepting an operator's grip. The electrodes are mounted on the handles through various mounting components, and form a pair of jaws for gripping a work piece. A first pair of electrodes 4200 and 4210 have a first polarity, and second pair 4300 and 4310 have a polarity opposite that of the first pair. According to this embodiment, the stripper head is spring loaded and biased toward a closed position wherein the pairs of electrodes are in contact with each other. Therefore, the operator would grip the handles 4100 and 4110 and apply a pressure to open the electrode jaws. The work piece is then inserted and the jaws closed, the electrode surfaces 4220, 4230, 4320 and 4330 each being in electrical communication with the work piece.

Figure 5:
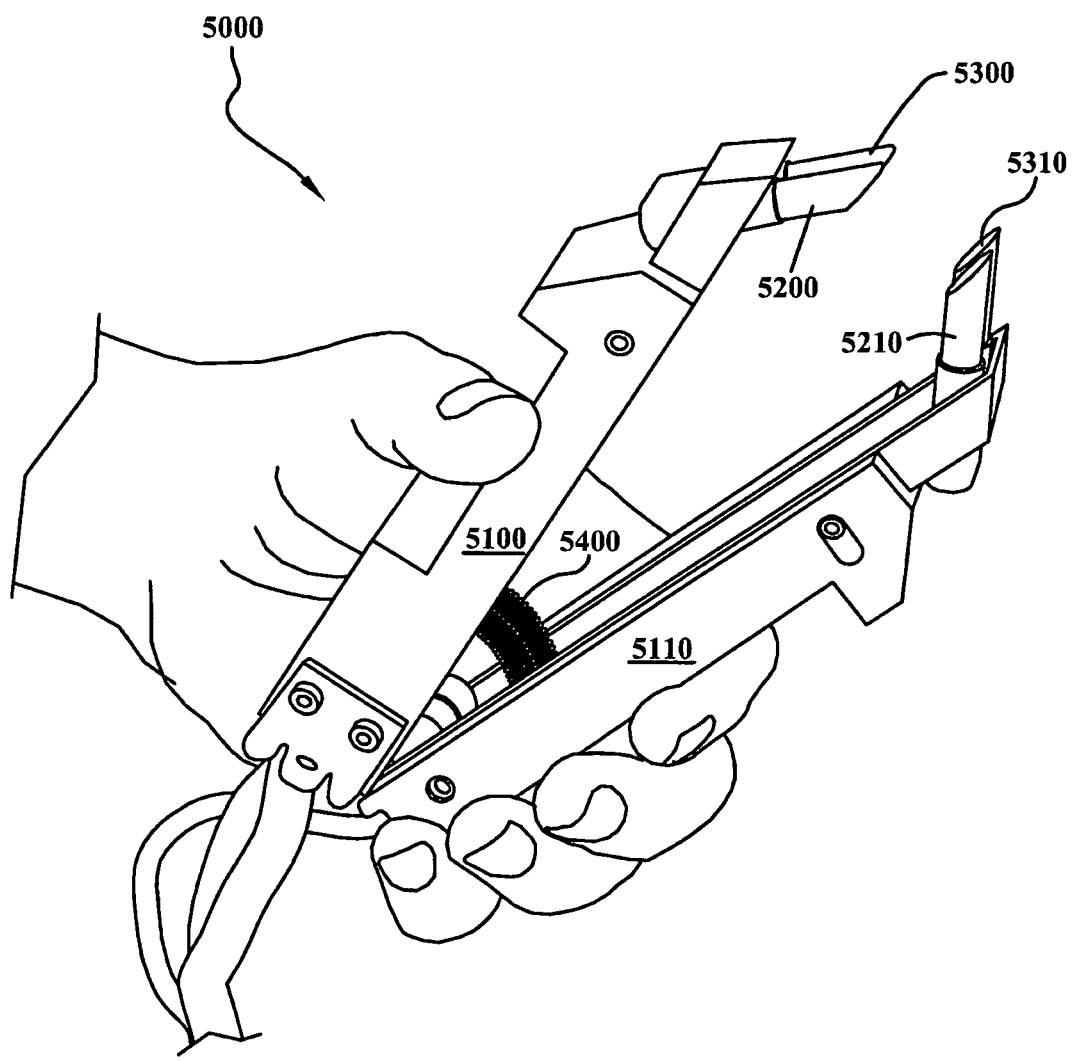
FIG. 5 is a drawing of a second hand-held spring-loaded embodiment.

FIG. 5 is a drawing of a second hand-held stripper head 5000. Similar to the 4000 embodiment, this stripper head includes a pair of handles 5100 and 5110 suitable for an operator's grip. The biasing springs 5400 are also shown. The stripper head 5000 also includes a first pair of electrodes 5200 and 5210 having a first polarity and a second pair of electrodes 5300 and 5310 having a polarity opposite that of the first pair.

It will be apparent to those skilled in the art that the above methods and apparatuses may incorporate changes and modifications without departing from the scope of this invention. It is intended to include all such modifications and alterations insofar as they come within the scope of the appended claims or the equivalents thereof.

We claim:

1. A device for stripping comprising: a step-up transformer stepping voltage up to between about 300 and about 600 volts; at least one capacitor in electrical communication with the step-up transformer and receiving an output of the step-up transformer; a discharge trigger and discharge circuit connected to the at least one capacitor; at least one step-down transformer connected to the discharge circuit; and a stripping head having at least one positively chargeable electrode and at least one negatively chargeable electrode, wherein: the at least one positive electrode comprises a pair of opposable positive electrodes that are mechanically biased toward each other; the at least one negative electrode comprises a pair of opposable negative electrodes that are mechanically biased toward each other; the at least one positively chargeable electrode and the at least one negatively chargeable electrode are connected to an output of the step-down transformer; and a discharge current flows between the pair of positive electrodes and the pair of negative electrodes through at least a portion of an associated work piece; a rectifier in electrical communication with the step-up transformer and the at least one capacitor, wherein the rectifier receives input from the step-up transformer and directs output to the at least one capacitor; a relay in electrical communication with the step-up transformer and with the rectifier, wherein: the relay receives input from the step-up transformer and directs output to the rectifier; the relay receives a first control signal for switching the relay; the discharge circuit comprises a silicon controlled rectifier receiving an input from the at least one capacitor and having an output; and the silicon controlled rectifier receives a second control signal for switching the silicon controlled rectifier; a sequential timer; a pulse transformer connected between the sequential timer and the silicon controlled rectifier, wherein: the sequential timer receives an input from the discharge trigger; the sequential timer sends the second control signal through the pulse transformer; and the sequential timer sends the first control signal; a variable resistor that adjusts a charge voltage across the at least one capacitor, the variable resistor being connected to the at least one capacitor and in electrical communication with the step-up transformer; and a residual-discharge circuit, which is different from the discharge circuit that is connected to the at least one capacitor, comprising: an on-delay timer; a discharge relay; and a discharge resistor electrically connected to the at least one capacitor; wherein: the residual-discharge circuit drains residual charge from the at least one capacitor; wherein an output of the on-delay timer is connected to a control input of the discharge relay; and wherein the discharge relay is connected in series with the discharge resistor.

2. The device of claim 1, wherein the step-up transformer comprises at least two step-up transformers arranged in series.

* * * * *